(12) United States Patent
Bultitude et al.

(10) Patent No.: US 8,125,762 B2
(45) Date of Patent: Feb. 28, 2012

(54) HIGH VOLTAGE CAPACITORS

(75) Inventors: John Bultitude, Greenville, SC (US); John Jiang, Milford, CT (US); John Rogers, Seymour, CT (US)

(73) Assignee: Vishay Sprague, Inc., Sanford, ME (US)

( * ) Notice: Subject to any disclaimer, the term of this patent is extended or adjusted under 35 U.S.C. 154(b) by 587 days.

(21) Appl. No.: 12/189,465

(22) Filed: Aug. 11, 2008

(65) Prior Publication Data

US 2010/0033894 A1 Feb. 11, 2010

(51) Int. Cl.
*H01G 4/228* (2006.01)
*H01G 4/005* (2006.01)
*H01G 4/008* (2006.01)

(52) U.S. Cl. ............... 361/306.3; 361/306.1; 361/301.4; 361/303; 29/25.42

(58) Field of Classification Search ............... 361/306.3, 361/301.4, 303, 306.1; 29/25.42
See application file for complete search history.

(56) References Cited

U.S. PATENT DOCUMENTS

| | | | |
|---|---|---|---|
| 3,549,956 A * | 12/1970 | Polle | 361/312 |
| 3,683,469 A | 8/1972 | Capek et al. | |
| 3,710,211 A * | 1/1973 | Behn et al. | 361/309 |
| 4,226,011 A * | 10/1980 | Hunt | 29/25.42 |
| 4,731,697 A | 3/1988 | McLarney | |
| 5,144,523 A * | 9/1992 | Pageaud et al. | 361/308.1 |
| 5,657,199 A * | 8/1997 | Devoe et al. | 361/328 |
| 5,835,338 A | 11/1998 | Suzuki et al. | |
| 5,912,796 A * | 6/1999 | Price | 361/304 |
| 6,151,204 A * | 11/2000 | Shigemoto et al. | 361/305 |
| 6,473,291 B1 * | 10/2002 | Stevenson | 361/306.3 |
| 6,627,509 B2 | 9/2003 | Duva | |
| 6,842,327 B1 | 1/2005 | Diorio et al. | |
| 6,898,071 B2 | 5/2005 | Kirsten | |
| 6,903,918 B1 | 6/2005 | Brennan | |
| 6,912,115 B2 | 6/2005 | Kobayashi et al. | |
| 7,336,475 B2 * | 2/2008 | Bultitude et al. | 361/303 |
| 7,667,949 B2 * | 2/2010 | Maxwell | 361/306.3 |

(Continued)

FOREIGN PATENT DOCUMENTS

JP 09 045573 A 2/1997

(Continued)

OTHER PUBLICATIONS

International Search Report, PCT/US06/23338, Vishay Vitramon, Incorporated, Jul. 12, 2007, 2 pages.

*Primary Examiner* — Anatoly Vortman
(74) *Attorney, Agent, or Firm* — Volpe and Koenig, P.C.

(57) ABSTRACT

A multilayer ceramic capacitor component includes a ceramic capacitor body having opposite ends and comprised of a plurality of electrode layers and dielectric layers, first and second external terminals attached to the ceramic capacitor body. The plurality of electrode layers include a plurality of alternating layers of active electrodes extending inwardly from alternating ends of the ceramic capacitor body. The capacitor may include a plurality of side shields disposed within the plurality of alternating layers of active electrodes to provide shielding with the alternating layers of active electrodes having a pattern to increase overlap area to provide higher capacitance without decreasing separation between the alternative layers of active electrodes. The capacitor may have a voltage breakdown of 3500 volts DC or more in air. The capacitor may have a coating. The capacitor provides improved resistance to arc-over, high voltage breakdown in air, and allows for small case size.

49 Claims, 6 Drawing Sheets

U.S. PATENT DOCUMENTS

| | | |
|---|---|---|
| 7,715,173 B2 * | 5/2010 | Bultitude et al. ............. 361/303 |
| 2004/0190221 A1 | 9/2004 | Yamaguchi et al. |
| 2006/0245141 A1 | 11/2006 | Shirasu et al. |
| 2007/0195484 A1 | 8/2007 | Bultitude et al. |
| 2008/0030923 A1 * | 2/2008 | Maxwell .................... 361/306.3 |

FOREIGN PATENT DOCUMENTS

| | | |
|---|---|---|
| JP | 10 208971 A | 8/1998 |
| JP | 2001 297941 A | 10/2001 |
| JP | 2006 332601 A | 12/2006 |
| WO | 2007 016516 A | 2/2007 |

* cited by examiner

HIGH VOLTAGE CAPACITORS

BACKGROUND OF THE INVENTION

Multilayer ceramic capacitors generally have alternating layers of ceramic dielectric material and conductive electrodes. Various types of dielectric materials can be used and various types of physical configurations have been used. Capacitors for high voltage performance have been produced for many years using a "series design". In the series design the charge is stored between the floating electrode and electrodes connected to the terminals on either side as shown for a single floating electrode designs in FIG. 1. This compares to a standard capacitor design shown in FIG. 2 in which the electrodes alternatively connect to different terminals and the charge is stored between these electrodes. The capacitance for these designs is given by:

$$C = \varepsilon_o \varepsilon_r AN/T$$

Where C=Capacitance in F
$\varepsilon_o$=Permittivity of Free Space=$8.854 \times 10^{-12} Fm^{-1}$
$\varepsilon_r$=Permittivity of the Ceramic Material, a material dependent dimensionless constant
A=Effective Overlap Area of Electrodes $m^2$
N=Number of electrodes−1
T=Fired Active Thickness of Ceramic Separating the Layers However, in the case of the series design the effective overlap area is significantly reduced. The advantage of the series design is that the internal voltage acting on the electrodes is halved for the single floating electrode. It is possible to further separate the floating electrode to give more than one floating electrode per layer to reduce the internal voltage but this also lowers the effective overlap area reducing capacitance.

In addition to the internal voltage withstanding capability of these MLCCs it is also important that these parts are resistant to arc-over from the capacitor terminals. U.S. Pat. No. 4,731,697, to McLarney discloses a surface electrode with portions of the margin covered by a further dielectric layer to prevent arc over that requires laser trimming. However, it is important to note that exposed electrodes are subject to corrosion. Also the properties of exposed electrodes are significantly impacted by the environment factors, such as humidity, limiting the applications in which these capacitors can be used.

U.S. Pat. No. 6,627,509 to Duva discloses a method for producing surface flashover resistant capacitors by applying a para-poly-xylylene coating to the surface of multilayer ceramic capacitors followed by trimming the excess material from the terminals. In this case significant costs are associated with coating of the capacitors. Furthermore, the coating may not be compatible with the circuit board assembly processes and the presence of organic coatings in some electronic application such as satellites is limited because of out gassing concerns.

Thus, despite various efforts to reduce produce capacitors with high voltage breakdown and which minimize occurrence of arc over, problems remain. What is needed is an improved high voltage capacitor.

BRIEF SUMMARY OF THE INVENTION

Therefore, it is a primary object, feature, or advantage of the present invention to improve upon the state of the art.

It is a further object, feature, or advantage of the present invention to provide a multilayer ceramic capacitor which is resistant to arc-over.

It is a still further object, feature, or advantage of the present invention to provide a multilayer ceramic capacitor with high voltage breakdown in air.

A still further object, feature, or advantage of the present invention is to provide a multilayer ceramic capacitor with a design which retains high capacitance.

Another object, feature, or advantage of the present invention is to minimize the occurrence of unwanted disruptions due to arc-over when the capacitor is incorporated into an electronic circuit.

Yet another object, feature, or advantage of the present invention is to provide a capacitor with high voltage withstanding capability with a smaller case size allowing for miniaturization of circuits.

A further object, feature, or advantage of the present invention is to provide an improved capacitor which can be manufactured conveniently and economically.

One or more of these and/or other objects, features, or advantages of the present invention will become apparent from the specification and claims that follow.

According to one aspect of the present invention a multilayer ceramic capacitor component is provided. The capacitor includes a ceramic capacitor body having opposite ends and comprised of a plurality of electrode layers and dielectric layers. There are first and second external terminals attached to the ceramic capacitor body. There are a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly. There are also a plurality of internal electrode side shields within the ceramic capacitor body to thereby assist in providing resistance to arc-over. Each of the internal active electrodes being between corresponding internal electrode side shields and separated from the corresponding internal electrode side shields by a gap. Each of the internal active electrodes having a first portion with a first width proximate the internal electrode side shields and a second portion with a second width greater than the first width to thereby increase overlap area and allow for higher capacitance without decreasing separation between the internal active electrodes. The plurality of internal electrode side shields are configured to shield the internal active electrode to thereby further resist arc over between the internal active electrodes and the terminals.

According to another aspect of the present invention a multilayer ceramic capacitor component for providing improved high voltage characteristics is provided. The capacitor includes a ceramic capacitor body having opposite ends and comprised of a plurality of electrode layers and dielectric layers and first and second external terminals attached to the ceramic capacitor body. The plurality of electrode layers include a plurality of alternating layers of active electrodes extending inwardly from alternating ends of the ceramic capacitor body. There are a plurality of side shields disposed within the plurality of alternating layers of active electrodes to provide shielding. The alternating layers of active electrodes have a pattern which increases overlap area to provide higher capacitance without decreasing separation between the alternative layers of active electrodes.

According to another aspect of the present invention a multilayer ceramic capacitor component for providing improved high voltage characteristics is provided. The capacitor includes a ceramic capacitor body having opposite ends and comprised of a plurality of electrode layers and dielectric layers. There are first and second external terminals attached to the ceramic capacitor body. The plurality of electrode layers includes a plurality of alternating layers of active electrodes extending inwardly from alternating ends of the ceramic capacitor body. The multilayer ceramic capacitor component has a voltage breakdown of at least 3500 volts DC in air.

According to another aspect of the present invention, a multilayer ceramic capacitor component is provided for providing improved high voltage characteristics. The capacitor includes a ceramic capacitor body having opposite ends and comprised of a plurality of electrode layers and dielectric layers. There are first and second external terminals attached to the ceramic capacitor body. The plurality of electrode layers include a plurality of alternating layers of active electrodes extending inwardly from alternating ends of the ceramic capacitor body. The multilayer ceramic capacitor component has a voltage breakdown of at least 2500 volts DC in air. The ceramic capacitor body being sized to fit within case size 0603 packaging.

According to another aspect of the present invention, a multilayer ceramic capacitor component is provided for providing improved high voltage characteristics. The capacitor includes a ceramic capacitor body having opposite ends and comprised of a plurality of electrode layers and dielectric layers and first and second external terminals attached to the ceramic capacitor body. The plurality of electrode layers include a plurality of alternating layers of active electrodes extending inwardly from alternating ends of the ceramic capacitor body. The multilayer ceramic capacitor component has a breakdown voltage in air being substantially the breakdown voltage of air.

According to another aspect of the present invention, a multilayer ceramic capacitor component for providing improved high voltage characteristics includes a ceramic capacitor body having opposite ends and comprised of a plurality of electrode layers and dielectric layers and first and second external terminals attached to the ceramic capacitor body. The plurality of electrode layers include a plurality of alternating layers of active electrodes extending inwardly from alternating ends of the ceramic capacitor body. There is a coating on an outer surface of the ceramic capacitor body.

According to another aspect of the present invention, a multilayer ceramic capacitor component for providing improved high voltage characteristics is provided. The capacitor includes a ceramic capacitor body having opposite ends and comprised of a plurality of electrode layers and dielectric layers and first and second external terminals attached to the ceramic capacitor body. The plurality of electrode layers include a plurality of alternating layers of active electrodes extending inwardly from alternating ends of the ceramic capacitor body. The multilayer ceramic capacitor component has a breakdown voltage of at least 90 V/μm.

According to another aspect of the present invention, a method of manufacturing a multilayer ceramic component is provided. The method includes forming a ceramic capacitor body from a plurality of electrode layers and dielectric layers and attaching first and second external terminals on opposite ends of the ceramic capacitor body. The plurality of electrode layers comprise a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly. The plurality of electrode layers further includes a plurality of internal electrode side shields within the ceramic capacitor body to thereby assist in providing resistance to arc-over. Each of the internal active electrodes being between corresponding internal electrode side shields and separated from the corresponding internal electrode side shields by a gap. Each of the internal active electrodes having a first portion with a first width proximate the internal electrode side shields and a second portion with a second width greater than the first width to thereby increase overlap area and allow for higher capacitance without decreasing separation between the internal active electrodes. The plurality of internal electrode side shields are configured to shield the internal active electrode to thereby further resist arc over between the internal active electrodes and the terminals.

According to another aspect of the present invention, a method of manufacturing a multilayer ceramic component is provided. The method includes forming a ceramic capacitor body from a plurality of electrode layers and dielectric layers and attaching first and second external terminals on opposite ends of the ceramic capacitor body. The plurality of electrode layers include a plurality of alternating layers of active electrodes extending inwardly from alternating ends of the ceramic capacitor body. The method further includes coating an outer surface of the ceramic capacitor body with a coating material to increase breakdown voltage in air by 400 volts DC or higher.

According to another aspect of the present invention, a method of manufacturing a multilayer ceramic component is provided. The method includes forming a ceramic capacitor body from a plurality of electrode layers and dielectric layers and attaching first and second external terminals on opposite ends of the ceramic capacitor body. The plurality of electrode layers include a plurality of alternating layers of active electrodes extending inwardly from alternating ends of the ceramic capacitor body. The method further includes coating an outer surface of the ceramic capacitor body with a polyimide to increase breakdown voltage in air.

DETAILED DESCRIPTION OF THE PREFERRED EMBODIMENT

Figure 1:
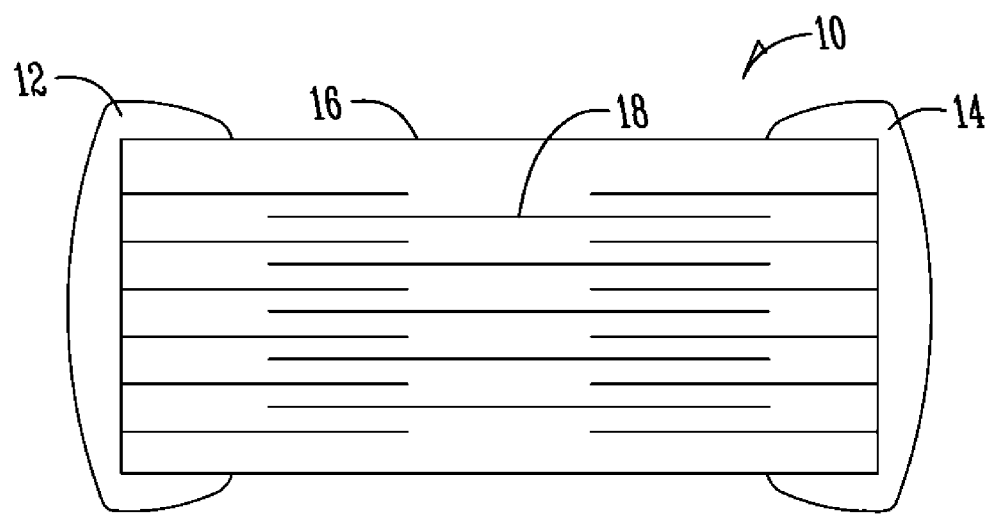
FIG. 1 is a diagram of a cross-section through a series capacitor design with a single floating electrode.
Figure 2:
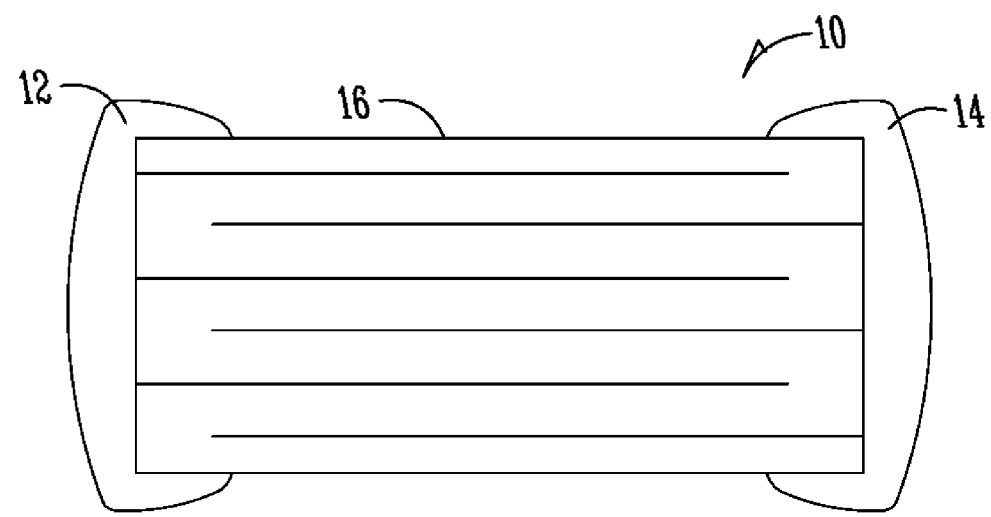
FIG. 2 is a diagram of a cross-section through a standard capacitor design.

FIG. 1 illustrates a prior art capacitor design. In FIG. 1, a capacitor 10 is shown with a first terminal 12 and an opposite second terminal 14 on the opposite end of the capacitor body 16. Floating electrodes 18 are shown. FIG. 2 illustrates another prior art capacitor design. In FIG. 2, instead of floating electrodes, the electrodes alternate.

Figure 3A:
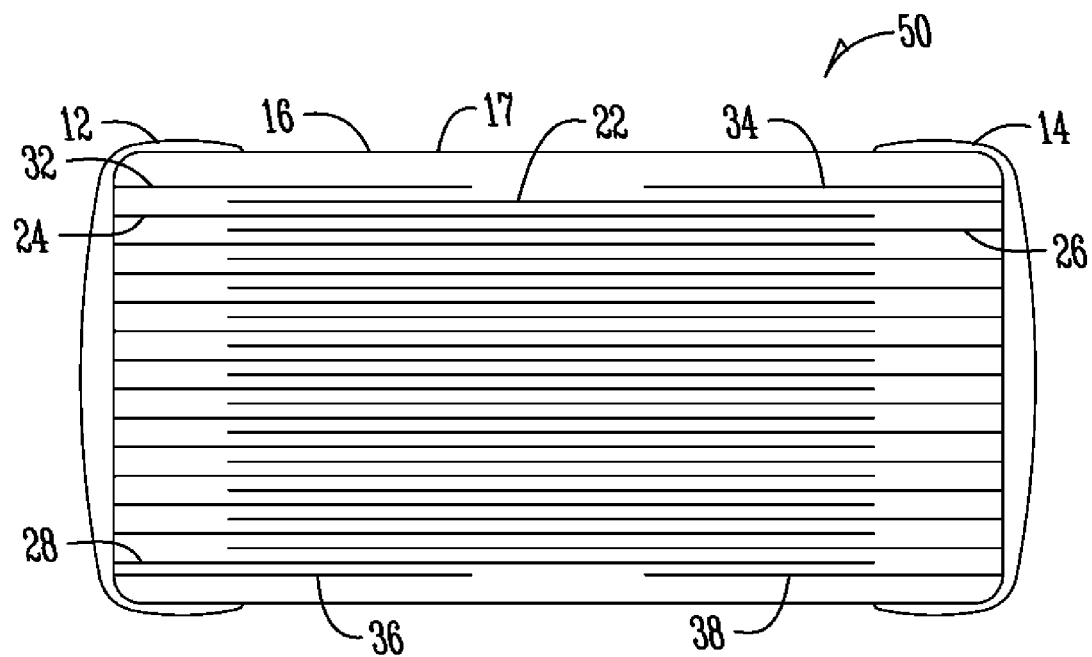
FIG. 3A is a side view cross-section drawing of one embodiment of a capacitor.
Figure 3B:
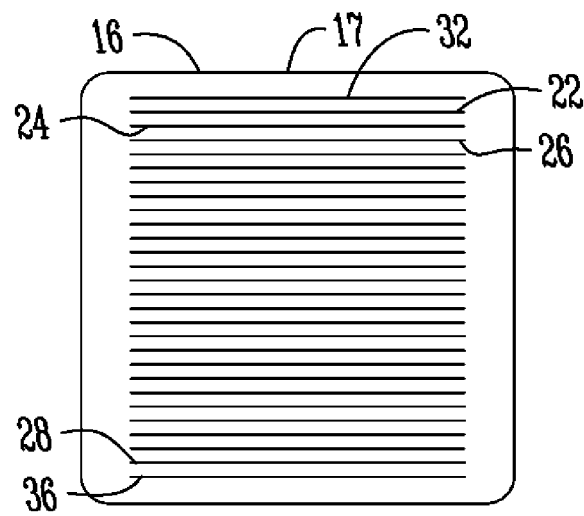
FIG. 3B is an end view cross-section drawing of the capacitor of FIG. 3A.

FIG. 3A is a side view cross-section of a capacitor with top and bottom shields while FIG. 3B is an end view of the cross-section of the capacitor shown in FIG. 3A. In FIG. 3A, a multilayer ceramic capacitor component 50 is shown. Note the presence of the internal electrode shields within the ceramic capacitor body which assist in providing resistance to arc-over between the terminals 12, 14 and internal electrodes 22, 24, 26, 28. The internal electrode shields shown include a top internal electrode shield 32 and an opposite bottom internal electrode shield 38. The top internal electrode shield 32 and the opposite bottom internal electrode shield 38 are on opposite sides of the multilayer ceramic capacitor body 16. Each internal electrode shield 32, 38 extends inwardly to or beyond a corresponding terminal 12, 14 to thereby provide shielding. Additional structures 34 and 36 are provided but are not required as they do not provide actual shielding due to the polarity of the terminals. They are included for convenience in the manufacturing process.

Figure 4A:
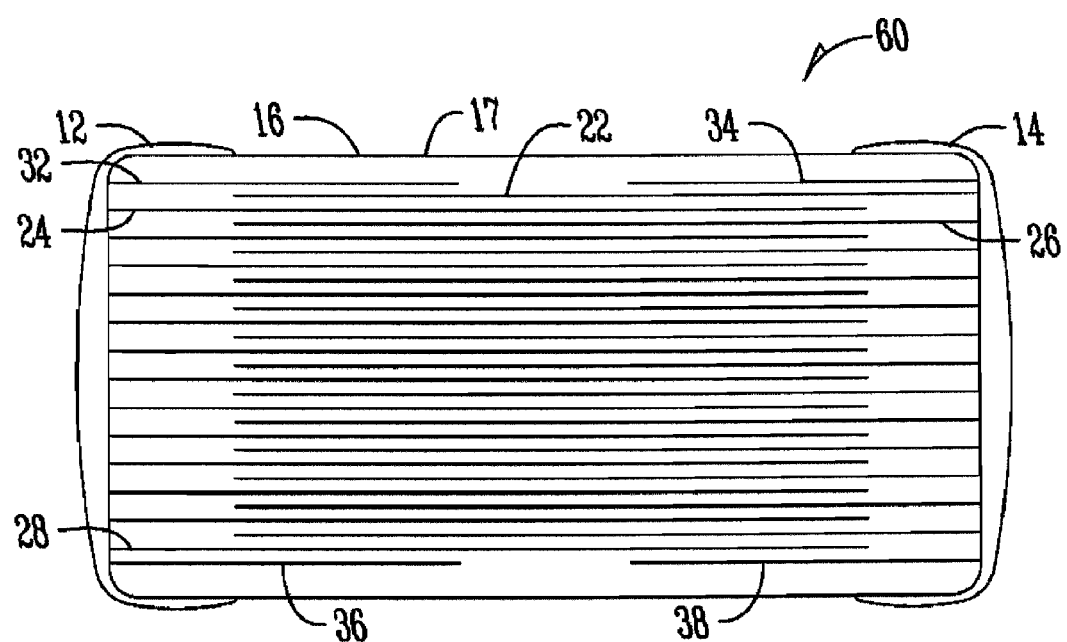
FIG. 4A is a side view cross-section drawing of an embodiment of a capacitor.
Figure 4B:
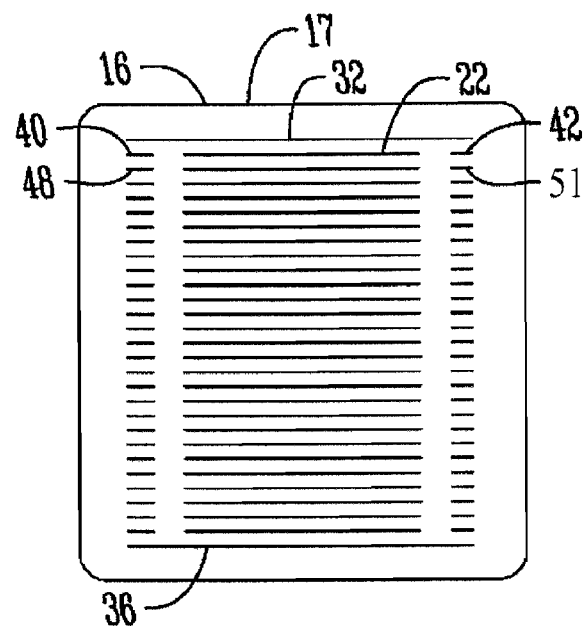
FIG. 4B is an end view cross-section drawing of the capacitor of FIG. 4A.

FIG. 4A is a side view cross-section of a capacitor with top and bottom shields as well as a side shield while FIG. 4B is an end view of the cross-section of the capacitor shown in FIG. 4A. The multilayer ceramic capacitor 60 of FIG. 4A includes not only the top shield 32 and opposite bottom shield 38, but also side shields 40, 42, 48, 51. The side shields are best shown in FIG. 4B that depicts a cross-section through the capacitor. The structure of the capacitors shown in FIGS. 3A, 3B, 4A, and 4B, are generally disclosed in U.S. Pat. No. 7,336,475, herein incorporated by reference in its entirety. The capacitor 50 in FIG. 3A and FIG. 3B and the capacitor 60 shown in FIGS. 4A and 4B may also include an optional coating 17 which will be further discussed later herein.

Figure 4C:
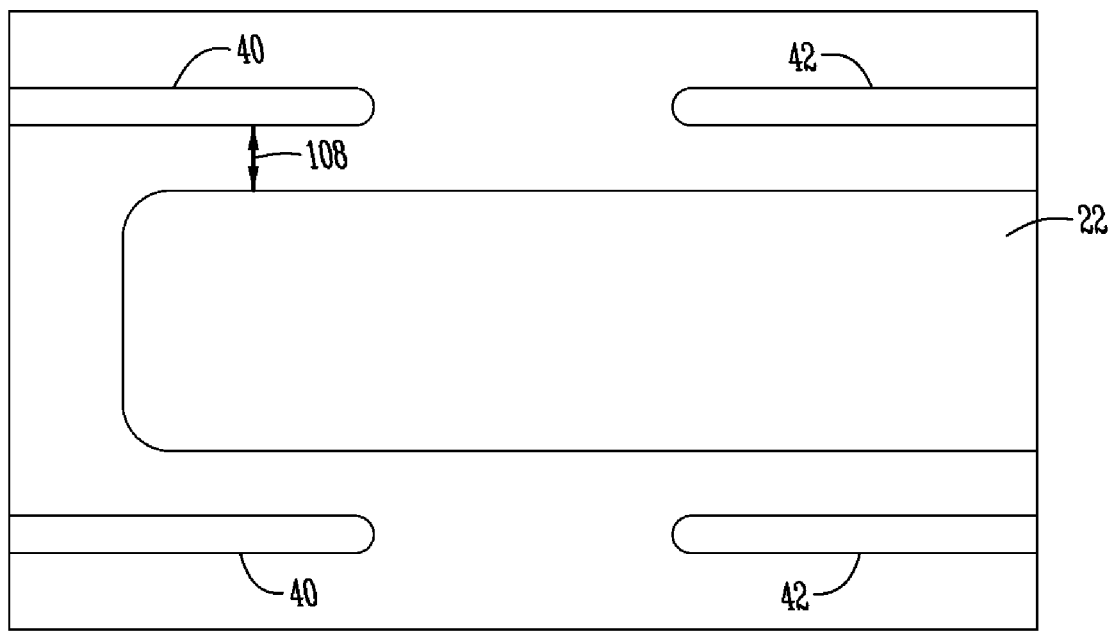
FIG. 4C illustrates a four side shield electrode pattern.

FIG. 4C illustrates an electrode 22 of the capacitor 60. The electrode 22 has side shields 40, 42 extending from opposite ends of the capacitor. Note also, that in the configuration shown, a total of four side shields are associated with the electrode 22. There is a gap 108 between each side shield 40, 42 and the electrode. The gap is the distance separating each side shield from the opposing active electrode in the screen design used to print the electrode pattern on the green ceramic cast layers. The gap may be changed.

Figure 5:
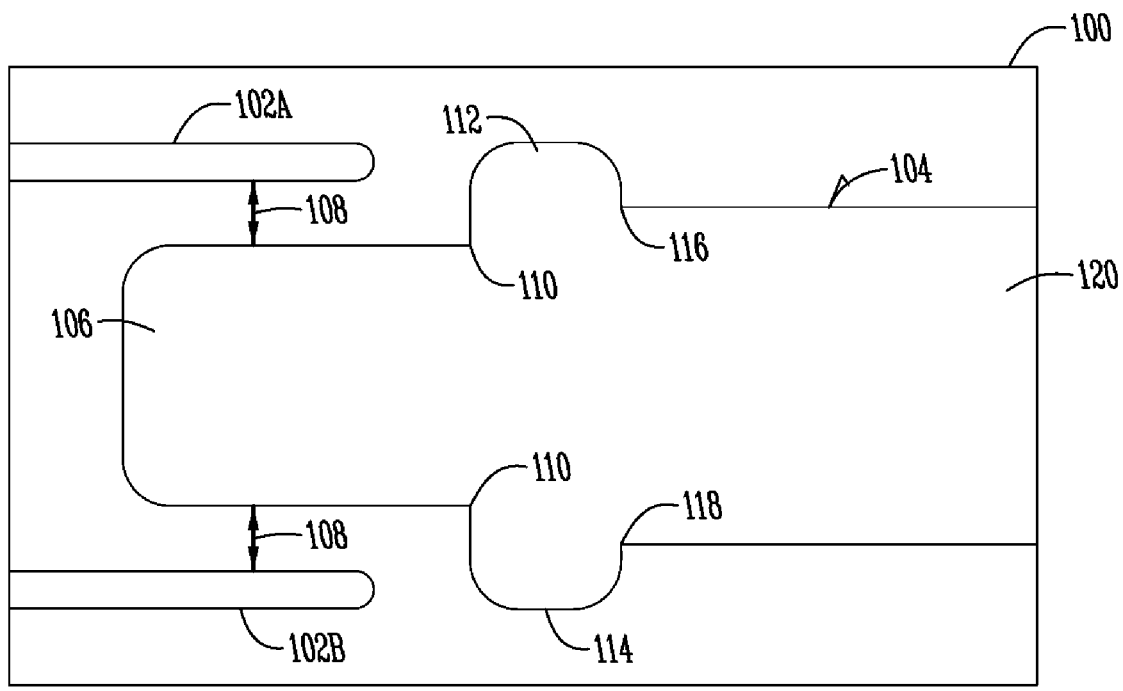
FIG. 5 illustrates an optimized pattern where two side shields are used to shield an electrode, according to one embodiment of the present invention.

The Effective Overlap Area of Electrodes (A) is reduced due to the presence of the side shields thereby resulting in reduced capacitance. However, FIG. 5 illustrates an improved pattern 100 with an optimized overlap area which allows for higher capacitance. In FIG. 5, an electrode 104 is shown with only two side shields 102A, 102B positioned above and below the electrode 104 and extending to the same side of the device. The electrode 104 is separated from each of the side shields 102A, 102B by a gap 108. The electrode 104 has a first portion 106 proximate the two side shields and separated from each of the side shields 102 by the gaps 108. The first portion 106 includes the floating end of the electrode 104. At the points 110, the width of the electrode 104 increases forming an upward protrusion 112 and a downward protrusion 114. The upward protrusion 112 extends to the top of the side shield 102A while the downward protrusion 114 extends to the bottom of the side shield 102B. A thicker portion 120 of the electrode extends to points 116 and 118 to meet the protrusions 112, 114. The thicker portion 120 of the electrode extends to the end of the electrode 104.

The geometry of the pattern 100 uses only two side shields per electrode 104 and allows for an increase in electrode overlap area. For example, a 4.94 percent increase of electrode area may be achieved in a 2225 case size while a 8.23 percent increase of electrode area may be achieved in an 0805 case size, thereby increasing capacitance. The percentage of increase is more pronounced in smaller case sizes or where a wider gap is used. If the gap increases, the voltage breakdown in air increases.

Figure 6:
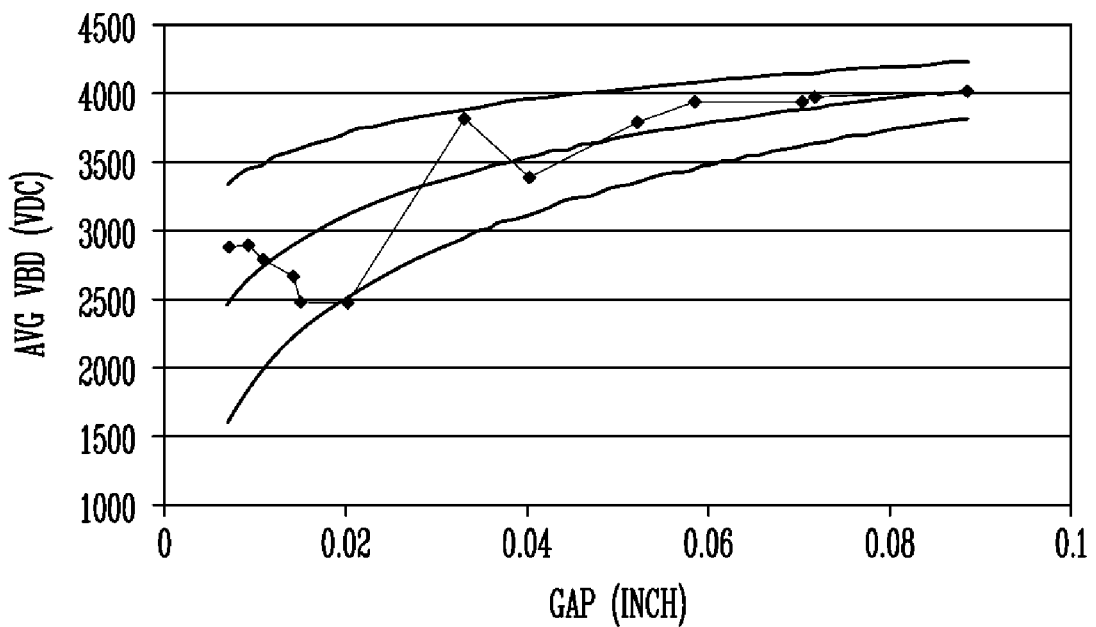
FIG. 6 is a graph illustrating the average breakdown voltage versus the gap width for one embodiment of a capacitor.

FIG. 6 illustrates the relationship between the gap width and voltage breakdown in air for 184 lots of an X7R capacitor in an 1812 package size. Note that as the gap increases in size, the average breakdown voltage increases.

Figure 7:
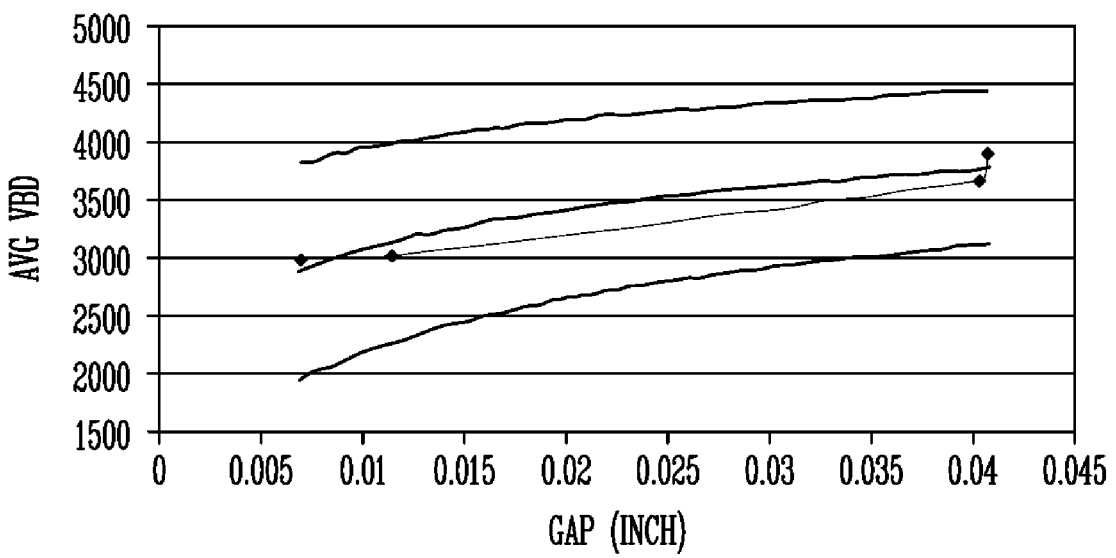
FIG. 7 is a graph illustrating the average breakdown voltage versus the gap width for another embodiment of a capacitor.

FIG. 7 illustrates the relationship between the gap width and voltage breakdown in air for 109 lots of an NP0 capacitor in an 0805 package size. Note that as the gap increases in size, the average breakdown voltage increases.

Another aspect of the present invention relates to the ability to accommodate smaller case sizes. A 1000 pF capacitor was manufactured with a gap of 0.0007 inches. The terminals of the 0603 capacitors were measured to be an average of 0.038 inches (0.965 mm) apart as shown in the table below.

| Sample | Terminal Spacing |
| --- | --- |
| 1 | 0.041 |
| 2 | 0.04 |
| 3 | 0.04 |
| 4 | 0.039 |
| 5 | 0.038 |
| 6 | 0.038 |
| 7 | 0.038 |
| 8 | 0.037 |
| 9 | 0.035 |
| 10 | 0.034 |
| Average | 0.0380 |
| Sigma | 0.0022 |

Figure 8:
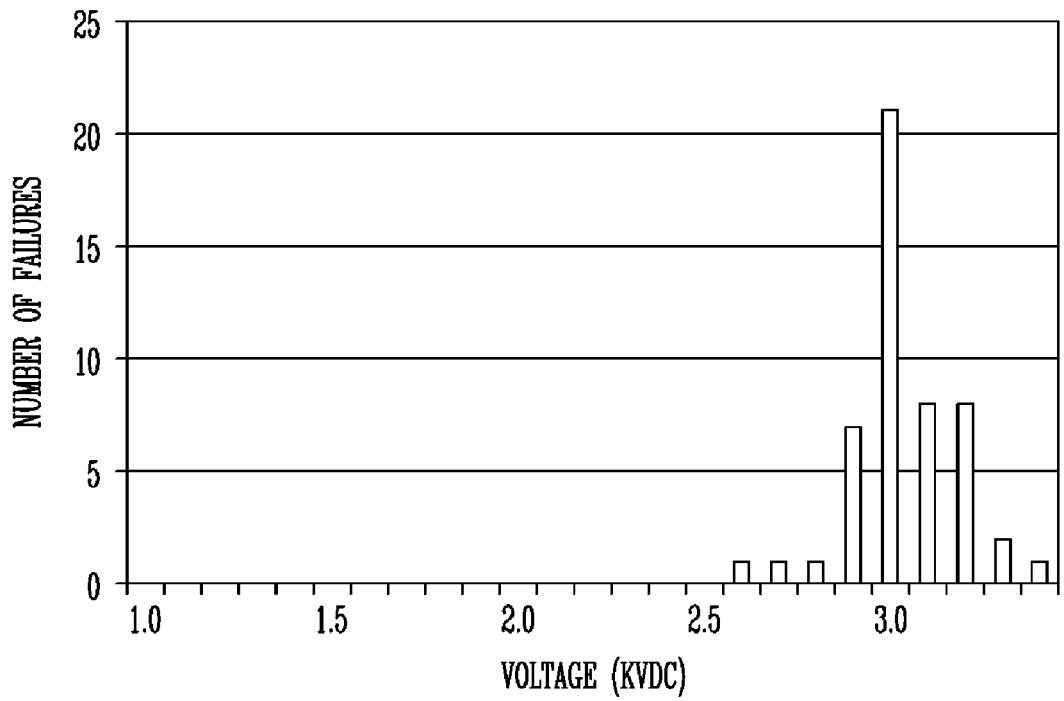
FIG. 8 is a voltage breakdown histogram for a capacitor with a capacitance value of 1000 pF packaged in an 0603 case size.

The resulting capacitor has an average breakdown voltage of 2959 VDC with no failures lower than 2500 VDC as shown in FIG. 8. Under ambient conditions air has been reported to breakdown at 3300 VDC/mm. In this case the average voltage breakdown is 2959/0.965=3066 VDC/mm which is near the theoretical limit. However, as can be seen in FIG. 8, some parts exceeded 3400 VDC. The breakdown can then be calculated as 3400/0.965=3523 V/mm (average spacing) or 3400/1.04=3269 V/mm (highest spacing 0.041 inches). Thus, it can be seen that the breakdown voltage, VBD, approaches the reported breakdown limit for air. Thus, a capacitor may have a breakdown voltage substantially the same as air which is a significant improvement.

According to another aspect of the present invention, an optimized coating to improve VBD performance is provided. Two MLCC components of 100 nF capacitance and 1812 package size were manufactured using the same material system and active layer separation except that one used a standard design and the other used the high voltage capacitor design of FIG. 3C with a gap of 0.007 inches. Samples (10 of each) were subjected to voltage breakdown testing in air, after applying and curing a polyimide coating on the ceramic surface and when submerged in FLUORINERT fluid (available from 3M). FLUORINERT is a trade name for a perfluroinated fluid. The average voltage breakdown values obtained are shown in the following table.

| Part Number | Part Type | Uncoated (kV) | SPM Coated (kV) | In FLUORINERT (kV) |
|---|---|---|---|---|
| 1812YJXG | HVArc Guard | 2.82 | 3.25 | 3.68 |
| 1812Y104KXE | Standard | 1.27 | 2.46 | 3.38 |

Note that in both designs, the FLUORINERT resulted in the highest breakdown voltage. However, the polyimide coating on the high voltage design results in a further increase in voltage breakdown of 400 VDC compared to the uncoated capacitor and nearly 800 VDC compared to the standard design.

Figure 9:
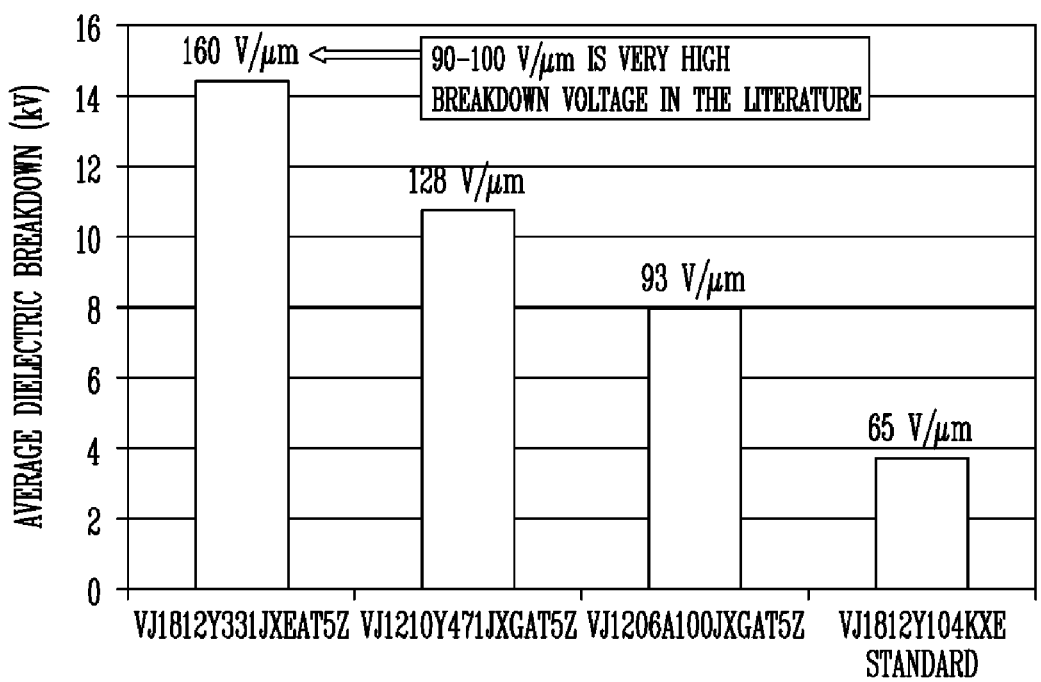
FIG. 9 is a graph showing average voltage breakdown in FLUORINERT for different capacitors.

The standard design was also compared to high voltage capacitor designs with wide gaps. Part number VJ1812Y331JXEAT5Z with a gap of 0.070 inches, VJ1210Y471JXGAT5Z with a gap of 0.040 inches, and VJ1206A100JXGAT5Z with a gap of 0.040 inches. The results of this comparison is shown in FIG. 9. Note in FIG. 9 that the average dielectric breakdown of greater than 90 V/μm. This is also a significant improvement.

Therefore an improved high voltage capacitor has been disclosed. The present invention is not to be limited to the specific embodiments shown in here. For example, the present invention contemplates numerous variations in the types of dielectric used, types of conductors used, sizes, dimensions, packaging, and other variations.

What is claimed is:

1. A multilayer ceramic capacitor component comprising:
a ceramic capacitor body having opposite ends and comprised of a plurality of electrode layers and dielectric layers;
first and second external terminals attached to the ceramic capacitor body;
a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
a plurality of internal electrode side shields within the ceramic capacitor body configured to provide resistance to arc-over;
wherein each of the internal active electrodes are disposed between corresponding internal electrode side shields and separated from the corresponding internal electrode side shields by a gap;
wherein each of the internal active electrodes have a first portion with a first width proximate the internal electrode side shields and a second portion with a second width greater than the first width, providing increased overlap area and allowing for higher capacitance without decreasing separation between the internal active electrodes.

2. The multilayer ceramic capacitor component of claim 1 further comprising a top internal electrode shield and an opposite bottom internal electrode shield wherein the top internal electrode shield and the bottom internal electrodes shield are on opposite sides of the plurality of internal electrodes.

3. The multilayer ceramic capacitor component of claim 1 wherein the gap is of sufficient size to provide a breakdown voltage in air of at least 3500 volts.

4. The multilayer ceramic capacitor component of claim 1 wherein the ceramic capacitor body is sized to fit within case size 0603 packaging.

5. The multilayer ceramic capacitor component of claim 4 wherein the multilayer ceramic capacitor component has a breakdown voltage of at least 2500 volts.

6. The multilayer ceramic capacitor component of claim 1 wherein the multilayer ceramic capacitor component has a breakdown voltage in air being substantially the breakdown voltage of air.

7. The multilayer ceramic capacitor component of claim 1 further comprising a coating on the ceramic capacitor body.

8. The multilayer ceramic capacitor component of claim 7 wherein the coating comprises a polyimide coating.

9. The multilayer ceramic capacitor component of claim 8 wherein the polyimide coating is sufficient to increase voltage breakdown by 400 volts.

10. The multilayer ceramic capacitor component of claim 7 wherein the wherein the coating comprises a perfluorocarbon.

11. The multilayer ceramic capacitor component of claim 1 wherein breakdown voltage being is greater than 90 V/μm.

12. A multilayer ceramic capacitor comprising:
a ceramic capacitor body having opposite ends and comprised of a plurality of electrode layers and dielectric layers;
first and second external terminals attached to the ceramic capacitor body;
a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
a plurality of internal electrode side shields within the ceramic capacitor body configured to provide resistance to arc-over between the electrodes and the terminals;
wherein each of the internal active electrodes are disposed between corresponding internal electrode side shields and separated from the corresponding internal electrode side shields by a gap;
wherein each of the internal active electrodes have a first portion with a first width proximate the internal electrode side shields and a second portion with a second width greater than the first width, providing increased overlap area and allowing for higher capacitance without decreasing separation between the internal active electrodes;
wherein each of the internal active electrodes further has an upward extending protrusion and an opposite downward extending protrusion positioned between the first portion and the second portion.

13. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a plurality of alternating layers of active electrodes extending inwardly from alternating ends of the ceramic capacitor body;
a plurality of side shields disposed within the plurality of alternating layers of active electrodes and configured to provide shielding;

wherein each of the active electrodes are disposed between corresponding electrode side shields and separated from the corresponding electrode side shields by a gap; and wherein each of the active electrodes have a first portion with a first width proximate the side shields and a second portion with a second width greater than the first width, providing for a pattern having an increased electrode overlap area and providing higher capacitance without decreasing separation between the alternative layers of active electrodes.

14. The multilayer ceramic capacitor component of claim 13 wherein the pattern having has a reduced width proximate corresponding side shields.

15. The multilayer ceramic capacitor component of claim 13 wherein the gap being of sufficient size to provide breakdown voltage in air of at least 3500 volts.

16. The multilayer ceramic capacitor component of claim 13 wherein the ceramic capacitor body is sized to fit within case size 0603 packaging.

17. The multilayer ceramic capacitor component of claim 16 wherein the multilayer ceramic capacitor component has a breakdown voltage of at least 2500 volts.

18. The multilayer ceramic capacitor component of claim 13 wherein the multilayer ceramic capacitor component has a breakdown voltage in air being substantially the breakdown voltage of air.

19. The multilayer ceramic capacitor component of claim 13 further comprising a coating on the ceramic capacitor body.

20. The multilayer ceramic capacitor component of claim 19 wherein the coating comprises a polyimide coating.

21. The multilayer ceramic capacitor component of claim 20 wherein the polyimide coating is sufficient to increase voltage breakdown by 400 volts in air.

22. The multilayer ceramic capacitor component of claim 19 wherein the wherein the coating comprises a perfluorocarbon.

23. The multilayer ceramic capacitor component of claim 13 wherein voltage breakdown is greater than 90 V/μm.

24. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a plurality of alternating layers of active electrodes extending inwardly from alternating ends of the ceramic capacitor body;
a plurality of side shields disposed within the plurality of alternating layers of active electrodes;
wherein each of the active electrodes are disposed between corresponding electrode side shields and separated from the corresponding electrode side shields by a gap;
wherein each of the active electrodes have a first portion with a first width proximate the side shields and a second portion with a second width greater than the first width; and
wherein the plurality of side shields and the plurality of alternating layers are configured to provide a voltage breakdown of at least 3500 volts DC in air.

25. The multilayer ceramic capacitor component of claim 24 further comprising a coating on an outer surface of the ceramic capacitor body.

26. The multilayer ceramic capacitor component of claim 24 wherein each of the active electrodes further has an upward extending protrusion and an opposite downward extending protrusion positioned between the first portion and the second portion.

27. The multilayer ceramic capacitor component of claim 26 wherein each of the active electrodes has a first protrusion and an opposite second protrusion positioned between the first portion and the second portion.

28. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a plurality of alternating layers of active electrodes extending inwardly from alternating ends of the ceramic capacitor body;
a plurality of side shields disposed within the plurality of alternating layers of active electrodes;
wherein each of the active electrodes are disposed between corresponding electrode side shields and separated from the corresponding electrode side shields by a gap;
wherein each of the active electrodes have a first portion with a first width proximate the side shields and a second portion with a second width greater than the first width;
the plurality of side shields and the plurality of alternating layers are configured to provide a voltage breakdown of at least 2500 volts DC in air; and
wherein the ceramic capacitor body is sized to fit within case size 0603 packaging.

29. The multilayer ceramic capacitor component of claim 28 further comprising a coating on an outer surface of the ceramic capacitor body.

30. The multilayer ceramic capacitor component of claim 28 wherein each of the active electrodes further has an upward extending protrusion and an opposite downward extending protrusion positioned between the first portion and the second portion.

31. The multilayer ceramic capacitor component of claim 28 wherein each of the active electrodes has a first protrusion and an opposite second protrusion positioned between the first portion and the second portion.

32. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a plurality of alternating layers of active electrodes extending inwardly from alternating ends of the ceramic capacitor body;
a plurality of side shields disposed within the plurality of alternating layers of active electrodes;
wherein each of the active electrodes are disposed between corresponding electrode side shields and separated from the corresponding electrode side shields by a gap;
wherein each of the active electrodes have a first portion with a first width proximate the side shields and a second portion with a second width greater than the first width; and
wherein the multilayer ceramic capacitor component having breakdown voltage in air being substantially the breakdown voltage of air.

33. The multilayer ceramic capacitor component of claim 32 further comprising a coating on an outer surface of the ceramic capacitor body.

34. The multilayer ceramic capacitor component of claim 32 wherein each of the active electrodes further has an upward extending protrusion and an opposite downward extending protrusion positioned between the first portion and the second portion.

35. The multilayer ceramic capacitor component of claim 34 wherein each of the internal active electrodes has a first protrusion and an opposite second protrusion positioned between the first portion and the second portion.

36. A multilayer ceramic capacitor component for providing improved high voltage characteristics, comprising:
 a ceramic capacitor body having opposite ends and comprised of a plurality of electrode layers and dielectric layers;
 first and second external terminals attached to the ceramic capacitor body;
 wherein the plurality of electrode layers comprise a plurality of alternating layers of active electrodes extending inwardly from alternating ends of the ceramic capacitor body;
 a plurality of side shields disposed within the plurality of alternating layers of active electrodes;
 wherein each of the active electrodes are disposed between corresponding electrode side shields and separated from the corresponding electrode side shields by a gap;
 wherein each of the active electrodes have a first portion with a first width proximate the side shields and a second portion with a second width greater than the first width; and
 a coating on an outer surface of the ceramic capacitor body.

37. The multilayer ceramic capacitor component of claim 36 wherein the coating comprises a polyimide.

38. The multilayer ceramic capacitor component of claim 36 wherein the coating is sufficient to increase breakdown voltage in air by 400 volts DC or higher.

39. The multilayer ceramic capacitor component of claim 36 wherein each of the active electrodes further has an upward extending protrusion and an opposite downward extending protrusion positioned between the first portion and the second portion.

40. The multilayer ceramic capacitor component of claim 36 wherein each of the internal active electrodes has a first protrusion and an opposite second protrusion positioned between the first portion and the second portion.

41. A multilayer ceramic capacitor component for providing improved high voltage characteristics, comprising:
 a ceramic capacitor body having opposite ends and comprised of a plurality of electrode layers and dielectric layers;
 first and second external terminals attached to the ceramic capacitor body;
 wherein the plurality of electrode layers comprise a plurality of alternating layers of active electrodes extending inwardly from alternating ends of the ceramic capacitor body;
 a plurality of side shields disposed within the plurality of alternating layers of active electrodes;
 wherein each of the active electrodes are disposed between corresponding electrode side shields and separated from the corresponding electrode side shields by a gap;
 wherein each of the active electrodes have a first portion with a first width proximate the side shields and a second portion with a second width greater than the first width; and
 wherein the plurality of side shields and the plurality of alternating layers are configured to provide a breakdown voltage at least 90 V/μm.

42. The multilayer ceramic capacitor component of claim 41 further comprising a coating on an outer surface of the ceramic capacitor body.

43. The multilayer ceramic capacitor component of claim 41 wherein the pattern has a reduced width proximate corresponding side shields.

44. The multilayer ceramic capacitor component of claim 43 wherein each of the internal active electrodes has a first protrusion and an opposite second protrusion positioned between the first portion and the second portion.

45. A method of manufacturing a multilayer ceramic component, comprising:
 forming a ceramic capacitor body from a plurality of electrode layers and dielectric layers;
 attaching first and second external terminals on opposite ends of the ceramic capacitor body;
 wherein the plurality of electrode layers comprise a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
 wherein the plurality of electrode layers further comprises a plurality of internal electrode side shields within the ceramic capacitor body configured to provide resistance to arc-over between the electrode layers and the terminals;
 wherein each of the internal active electrodes are disposed between corresponding internal electrode side shields and separated from the corresponding internal electrode side shields by a gap;
  wherein each of the internal active electrodes has a first portion with a first width proximate the internal electrode side shields and a second portion with a second width greater than the first width, providing for an increased electrode overlap area and allowing for higher capacitance without decreasing separation between the internal active electrodes.

46. A method of manufacturing a multilayer ceramic component, comprising;
 forming a ceramic capacitor body from a plurality of electrode layers and dielectric layers;
 attaching first and second external terminals on opposite ends of the ceramic capacitor body;
 wherein the plurality of electrode layers comprise a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
 wherein the plurality of electrode layers further comprises a plurality of internal electrode side shields within the ceramic capacitor body configured to provide resistance to arc-over between the electrode layers and the terminals;
 wherein each of the internal active electrodes are disposed between corresponding internal electrode side shields and separated from the corresponding internal electrode side shields by a gap;

wherein each of the internal active electrodes has a first portion with a first width proximate the internal electrode side shields and a second portion with a second width greater than the first width, providing for an increased electrode overlap area and allowing for higher capacitance without decreasing separation between the internal active electrodes;

wherein each of the internal active electrodes further has an upward extending protrusion and an opposite downward extending protrusion positioned between the first portion and the second portion.

47. A method of manufacturing a multilayer ceramic component, comprising:
    forming a ceramic capacitor body from a plurality of electrode layers and dielectric layers;
    attaching first and second external terminals on opposite ends of the ceramic capacitor body;
    wherein the plurality of electrode layers comprise a plurality of alternating layers of active electrodes extending inwardly from alternating ends of the ceramic capacitor body;
    wherein the plurality of electrode layers further comprises a plurality of internal electrode side shields within the ceramic capacitor body configured to provide resistance to arc-over between the electrode layers and the terminals;
    wherein each of the active electrodes are disposed between corresponding electrode side shields and separated from the corresponding electrode side shields by a gap;
    wherein each of the active electrodes have a first portion with a first width proximate the side shields and a second portion with a second width greater than the first width; and
    coating an outer surface of the ceramic capacitor body with a coating material to increase breakdown voltage in air by 400 volts DC or higher.

48. The method of manufacturing of claim 47 wherein the coating material comprises polyimide.

49. A method of manufacturing a multilayer ceramic component, comprising:
    forming a ceramic capacitor body from a plurality of electrode layers and dielectric layers; attaching first and second external terminals on opposite ends of the ceramic capacitor body;
    wherein the plurality of electrode layers comprise a plurality of alternating layers of active electrodes extending inwardly from alternating ends of the ceramic capacitor body;
    wherein the plurality of electrode layers further comprises a plurality of internal electrode side shields within the ceramic capacitor body configured to provide resistance to arc-over between the electrode layers and the terminals;
    wherein each of the active electrodes are disposed between corresponding electrode side shields and separated from the corresponding electrode side shields by a gap;
    wherein each of the active electrodes have a first portion with a first width proximate the side shields and a second portion with a second width eater than the first width; and
    coating an outer surface of the ceramic capacitor body with a polyimide to increase breakdown voltage in air.

* * * * *